(12) United States Patent
Stiesdal

(10) Patent No.: US 12,304,600 B1
(45) Date of Patent: May 20, 2025

(54) METHOD OF ASSEMBLING A TUBULAR FLOATING STRUCTURE AND ITS USE

(71) Applicant: Stiesdal Offshore A/S, Give (DK)

(72) Inventor: Henrik Stiesdal, Odense C (DK)

(73) Assignee: Stiesdal Offshore A/S, Give (DK)

( * ) Notice: Subject to any disclaimer, the term of this patent is extended or adjusted under 35 U.S.C. 154(b) by 0 days.

(21) Appl. No.: 19/034,856

(22) Filed: Jan. 23, 2025

Related U.S. Application Data

(63) Continuation of application No. PCT/DK2023/050203, filed on Aug. 17, 2023.

(30) Foreign Application Priority Data

Aug. 18, 2022 (DK) ............................ PA 2022 00767

(51) Int. Cl.
*B63B 75/00* (2020.01)
*E04H 7/06* (2006.01)

(52) U.S. Cl.
CPC .......... *B63B 75/00* (2020.01); *B63B 2221/02* (2013.01)

(58) Field of Classification Search
CPC ....... B63B 75/00; B63B 2221/02; E04H 7/06; E02B 17/00
See application file for complete search history.

(56) References Cited

U.S. PATENT DOCUMENTS

| | | | |
|---|---|---|---|
| 4,618,757 A | 10/1986 | Cabany et al. | |
| 6,244,785 B1 * | 6/2001 | Richter | E02B 17/0004 405/195.1 |
| 6,575,665 B2 * | 6/2003 | Richter | E02B 17/025 405/195.1 |
| 7,044,072 B2 * | 5/2006 | Converse | B63B 75/00 405/195.1 |
| 2003/0165361 A1 * | 9/2003 | Richter | B63B 39/005 405/195.1 |
| 2006/0070568 A1 * | 4/2006 | Converse | B63B 75/00 114/355 |
| 2012/0096702 A1 * | 4/2012 | Kingsley | B23P 23/04 29/561 |
| 2020/0269960 A1 | 8/2020 | Boo et al. | |

FOREIGN PATENT DOCUMENTS

| | | | |
|---|---|---|---|
| DE | 202021106550 U1 * | 2/2022 | |
| EP | 0282126 A2 | 9/1988 | |
| FR | 2395903 A1 | 1/1979 | |
| WO | 02087804 A1 | 11/2002 | |
| WO | 2011009185 A1 | 1/2011 | |
| WO | 2019000066 A1 | 1/2019 | |
| WO | 2021053361 A1 | 3/2021 | |

* cited by examiner

*Primary Examiner* — Kyle Armstrong
(74) *Attorney, Agent, or Firm* — Elevated IP, LLC

(57) ABSTRACT

A first and a second tubular member are welded to opposite sides of a stiffening ring in order to obtain a double-segment. Further segments can be added to form a tubular multi-segment with stiffening rings in between adjacent tubular members. The resulting multi-segment is used as a tubular buoyancy module in a floating offshore structure.

20 Claims, 8 Drawing Sheets

METHOD OF ASSEMBLING A TUBULAR FLOATING STRUCTURE AND ITS USE

CROSS-REFERENCE TO RELATED APPLICATIONS

This application is a continuation under 35 U.S.C. 111 of International Patent Application No. PCT/DK2023/050203, filed Aug. 17, 2023, which claims the benefit of and priority to Danish Application No. PA 2022 00767, filed Aug. 18, 2022, each of which is hereby incorporated by reference in its entirety.

FIELD OF INVENTION

The present invention relates to methods of assembling a tubular floating structure for an offshore support, for example for an offshore wind turbine.

BACKGROUND

Offshore wind turbine support platforms, for example as disclosed in US patent application US2020/269960, as well as other types of support platforms in the offshore industry, for example as disclosed in international patent application WO2021/053361 for a floating fish farm, comprise buoyancy tanks that are moored to the seabed in order to keep the structure at the desired location.

For large platforms, the buoyancy tanks are correspondingly large, and fabrication can be a challenge. Typically, the buoyancy tanks are manually assembled and welded from curved steel plates supported by stiffening rings and stringers in a process that resembles shipbuilding and is highly labor-intensive. In a more industrial process, buoyancy tanks may be fabricated by the assembly and welding of complete, pre-fabricated, tubular elements welded together edge-to-edge in a row so that they form the tank with the desired tubular length. In order for the tubular members to maintain their tubular shape when in water, stiffening rings are inserted into the tubular member and welded to the inner surface of the tubular member as a measure against hydrostatic and dynamic pressure when installed under offshore conditions.

Stiffening rings are heavy, increase the expenses, and require time for installation, and therefore it is desired to reduce their number and facilitate production as well as shorten production time. Further, the insertion of the stiffening ring requires that the inner circle of the tubular member matches the outer circle of the stiffening ring with only small tolerances. However, due to the large size of the tubular member there is a risk that its diameter varies or that the shape of the segment deviates slightly from the circular shape and becomes oval, for example caused by handling and transport of the segment. Such deviation of the diameter and deviations from circular shape may lead to difficulties when inserting the circular stiffening ring. This is especially problematic when the segment is oriented with its central axis horizontally. Accordingly, it is better to insert the ring when the segment has its axis oriented vertically. However, in this case, when the welding is done along both edges of the ring, one welding has to be done from below the ring, which increases difficulty in the welding process. Each method has its disadvantages.

Accordingly, it would be desirable to find an improved assembly method which overcomes these disadvantages.

In other technical field, assembly of tubular members into an elongate tank is implemented as a standard, for example when assembling silos in agriculture. In some silo structures, the segments are provided with inner rings that are used for assembly with bolts. Other examples are found in French patent document FR2395903 in which the segments are provide with rings at their opposite ends and then stacked step-by step, and adjacent rings welded to each other by welding from the side. Side-welding of such rings is difficult, however, especially if the welding should be watertight. Accordingly, the methods known from silo production appear not successfully applicable in production of large-scale buoyancy tanks for floating offshore structures.

Consequently, there is a need for other and improved assembly principles.

BRIEF DESCRIPTION

It is therefore an objective of the invention to provide an improvement in the art. In particular, it is an objective to provide an assembly method for buoyancy tanks in offshore structures, especially for offshore wind turbines. This objective and further advantages are achieved with an assembly method as well as its use as described below.

In short, two tubular members are welded to opposite sides of a stiffening ring in order to obtain a double-segment. Further segments can be added to form a tubular multi-segment with a stiffening ring, which is a structure-stabilizing ring, in between adjacent tubular members. The resulting multi-segment is used as a tubular buoyancy module in a floating offshore structure.

In the following, the term tank is used alongside the term tubular buoyancy module because this is according to the terminology in the technical field. Similarly, a segment for the tubular buoyancy module will also be called a tank segment or simply a segment.

The assembly method comprises the following two main steps:
1. Fabrication of tank segments
2. Assembly of tank segments to form a complete tank A tank segment comprises a cylindrical tubular member and a stiffening ring. The tubular member forms a wall of the segment and of the final complete tank. Both parts are made of steel. The tubular member has a first edge and an opposite second edge at opposite ends of the tubular member. The stiffening ring has a first surface and an opposite second surface at opposite sides of the stiffening ring. The stiffening ring also has an outer circumference that is provided larger than the outer circumference of the first edge of the tubular member, and an inner circumference that is provided smaller than the inner circumference of the first edge of the tubular member. This way, there is some tolerance when positioning the tubular member on the stiffening ring.

In fabrication of a tank segment, the stiffening ring is placed flat (horizontal to ground) with a central axis oriented vertically, having its first surface upwards and resting on its second surface. The tubular member is then placed onto the stiffening ring from above with a vertical axis that is concentric or approximately concentric with the vertical central axis of the stiffening ring. Due to the concentricity of the vertical axes of the tubular member and the stiffening ring, the tubular member will rest on the first surface of the stiffening ring in a position where the outer circumference of the first edge of the tubular member is within the outer circumference of the first surface of the stiffening ring, and the inner circumference of the first edge of the tubular member is outside the inner circumference of the first surface of the stiffening ring relative to the vertical central axes of the tubular member and stiffening ring. In this position the tubular member and the stiffening ring are joined by welding, the welding forming a watertight seam.

Since the outer circumference of the first edge of the tubular member is within the outer circumference of the first surface of the stiffening ring, and the inner circumference of the first edge of the tubular member is outside the inner circumference of the first surface of the stiffening ring relative to the vertical central axes of the tubular member and stiffening ring, the welding is a fillet weld type, which may be carried out with or without full penetration. Due to the vertical axis orientation of the tubular member and the stiffening ring, the welding is carried out in a horizontal position, which is very convenient for execution.

After the completion of the fabrication of a tank segment, where the tubular member and the stiffening ring have been joined, the tank segment is rotated 180 degrees around a horizontal axis. While the stiffening ring has been placed below the tubular member during fabrication of the segment, it is positioned above the tubular member after rotation. The segment is now resting on the downwards facing second edge of the tubular member, and the second surface of the stiffening ring now forms the upper surface of the tank segment.

Assembly of tank segments is carried out by placing a second segment on top of a first segment. The second segment is placed from above with a vertical axis that is concentric or approximately concentric with the vertical axis of the first segment and with the second edge of its tubular member resting on the second surface of the stiffening ring of the first segment. Due to the concentricity of the vertical axes, the second segment will be placed in a position where the outer circumference of the second edge of the second tubular member is within the outer circumference of the second surface of the stiffening ring of the first segment, and where the inner circumference of the second edge of the tubular member of the second segment is outside the inner circumference of the second surface of the stiffening ring of the first segment relative to the vertical central axes of the tubular members and stiffening ring. In this position the tubular member of the second segment and the stiffening ring of the first segment are joined by welding, the welding forming a watertight seam.

As the outer circumference of the second edge of the tubular member of the first segment is within the outer circumference of the second surface of the stiffening ring of the second segment, and the inner circumference of the second edge of the tubular member of the first segment is outside the inner circumference of the second surface of the stiffening ring of the second segment relative to the vertical central axes of the tubular members and stiffening ring, the welding is a fillet weld type, which may be carried out with or without full penetration. Due to the vertical axis orientation of the tubular member and the stiffening ring, the welding is carried out in a horizontal position, which is very convenient for execution.

This method of fabrication and assembly of tank segments has a number of advantages over conventional techniques.

Due to the welding being made with the segment on the respective stiffening ring, instead of the ring being inserted into the segment, time is saved, and the requirements for tolerances between the tubular member and the stiffening ring are less, which eases fabrication substantially.

Similarly, due to the placing of the tubular member on top of the stiffening ring during fabrication of the segments, tolerance requirements between individual tubular members are significantly reduced. In conventional manufacturing methods where the tubular members are placed directly on top of each other, the diameter and roundness of two adjacent tubular members need to be the same in order to obtain a joint without stress concentrations arising as a consequence of misalignment between the tubular members. In the manufacturing method according to the present disclosure, certain variations of diameter and roundness of two adjacent tubular members are allowable, since the stiffening ring inserted between the tubular members will significantly reduce stress concentrations arising as a consequence of misalignment between the tubular members.

All in all, the method is an improvement in the assembly of buoyancy elements for offshore structures, for example when used for assembling a buoyancy module of a tubular floating wind turbine offshore structure.

In some embodiments, a first welding station is provided which comprises a plurality of rollers which are arranged in a circular configuration, and which are configured for rotationally supporting a first stiffening ring on the rollers in a horizontal orientation during the welding between a first tubular member and the first stiffening ring. As it will become apparent below, this first station is used for welding of subsequent tubular members onto respective rings in order to provide additional segments for assembling multi-segment tubes. In the first welding station, one or more welding machines are provided for the welding.

In some embodiments, one or more welding machines are placed on both the outside and the inside of the tubular member, thereby facilitating simultaneous welding on both sides of the welding seam.

The welding machines are advantageously provided at fixed locations of the first welding station, and the welding of the tubular member to the stiffening ring is done while rotating the combination of tubular member and stiffening ring about its vertical central axis, instead of moving the head along the edge.

This practical embodiment is advantageous in that the stationary welding machines need minimal and only simple mechanical support as compared to welding machines moving around the ring, as in the case of large movements of the head, precision can be a challenge. This is especially so when the segments have a diameter in the range of 5 to 15 meters.

In an advantageous embodiment, a second welding station is provided, comprising a plurality of rollers arranged in a circular configuration and configured for rotationally supporting the first segment with its second ring-free edge when the respective first ring is facing upwards and in a horizontal orientation.

In practice, after welding of the first tubular member to the first stiffening ring in the first welding station in order to obtain the first segment, the resulting first segment is turned upside down so that the first stiffening ring is facing upwards, and the first segment is lifted onto the second welding station with the rollers rotationally supporting the second edge of the first segment.

Optionally, for protection of the rollers against the potentially sharp downward facing edge, a support ring or support plate is provided between the downward facing edge and the rollers.

After welding of the second tubular member to the second stiffening ring in the first welding station, the resulting second segment is turned upside down so that the second ring is facing upwards. The second segment is lifted onto the first ring of the first segment in the second welding station to form a double segment.

Advantageously, as explained for the first welding station, one or more welding machines are places on both the outside and the inside of the tubular member, thereby facilitating simultaneous welding on both sides of the welding seam. The welding machines are advantageously provided at fixed locations of the second welding station, and the welding of the segment to the ring is done while rotating the two segments about their vertical axes, instead of moving the head along the edge.

Optionally, the height of the welding heads of the welding machines are adjustable, for example by being mounted on the arm of a welding robot. Thereby, the height of the welding head can be adjusted to match the height of the single segment. However, if all segments have a single standardized height, no height adjustment of the head is necessary.

For extending the multi-segment structure in length even further, which is typically done in practice in order to construct a buoyancy module of a desired height, additional segments can be fabricated and joined to the segments that are already joined by welding.

In an embodiment, an additional segment is fabricated using the same method as that used to fabricate the first segment. After fabrication, this additional segment is turned upside down and is lifted onto the second welding station. Then, the already assembled structure comprising two or more segments is placed from above on top of the additional segment with a vertical axis that is concentric or approximately concentric with the vertical axis of the additional segment. In this position the tubular member of the first segment and the stiffening ring of the second segment are joined by welding, the welding forming a watertight seam.

This method may be repeated with as many segments as relevant in order to achieve the desired height.

It is pointed out here that the method of lifting the already combined multi-segment with two or more segments onto an additional segment may appear counterintuitive as compared to lifting one single segment after the other on top of the already welded multi-segment. However, as will be explained below, this arrangement is made for good reason, as the welding head does not have to be lifted upwards with each added segment. Instead, by lifting the already welded multi-segment first to a storage station and then always onto only a single segment for the next welding, the welding head need not be lifted higher than the height of the single segment, which is typically in the range of 2 to 10 meters.

As mentioned above, for protection of the rollers, the second welding station optionally comprises a support ring or support plate in between the rollers and the second downward facing edge of the single segment that is lifted off the first and onto the second welding station. This becomes more important the more segments are welded together into an elongate tube, as the weight increases proportionally.

Advantageously, one, but rather both, welding stations comprise not only first rollers that support the combination of segment and ring from below but also second rollers that abut the combination sideways for positioning and guiding the rings and tubular members correctly during rotation and simultaneous welding.

BRIEF DESCRIPTION OF THE DRAWINGS

The disclosed methods will be explained in more detail with reference to the drawings, where.

DETAILED DESCRIPTION

Figure 1:
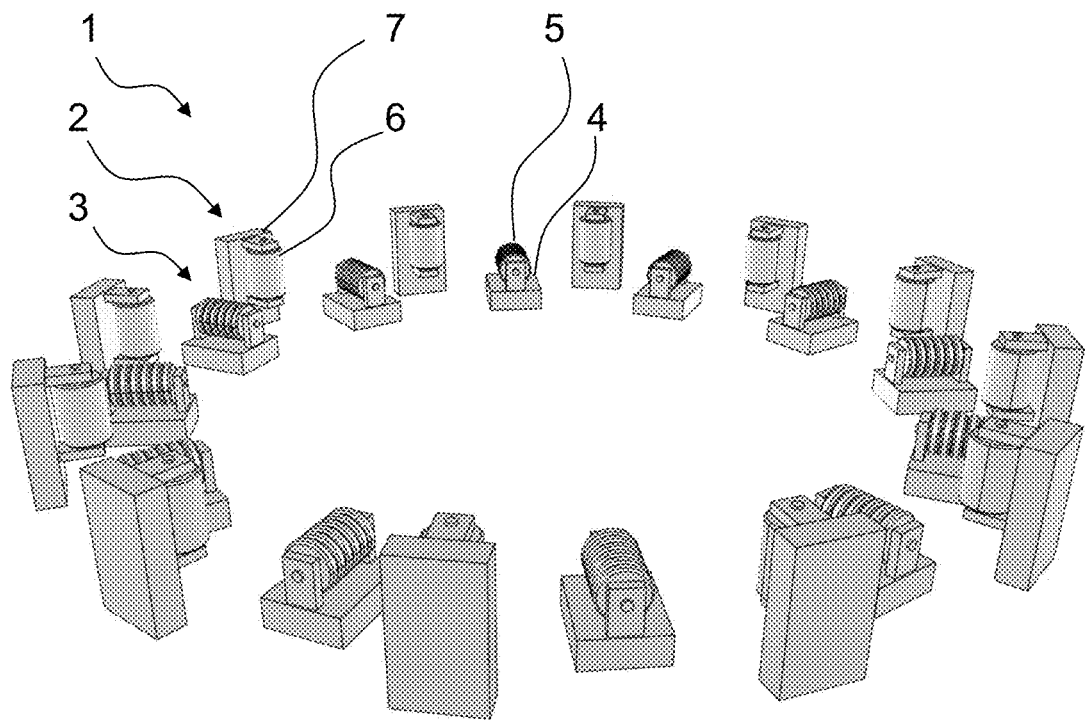
FIG. 1 illustrates a rotational support arrangement for a welding station.

FIG. 1 illustrates a rotational support arrangement for a welding station 1. It comprises a plurality of first rollers 5 on corresponding first frames 4 for rotationally supporting circular tubular segments from below for welding. The first frames 4 and first rollers 5 are arranged in a circular configuration for supporting corresponding circular structures. It also comprises second rollers 6 on corresponding second frames 7 for abutting such circular tubular structures from the side and guiding them properly in rotational movement about a vertical central axis.

Optionally, the second rollers 6 are radially movable in and out in a horizontal direction. This is useful if the segment diameter changes and also in order to easier fit a ring-shaped segment into the roller station 1, even if it deviates slightly from a circle.

Figure 2:
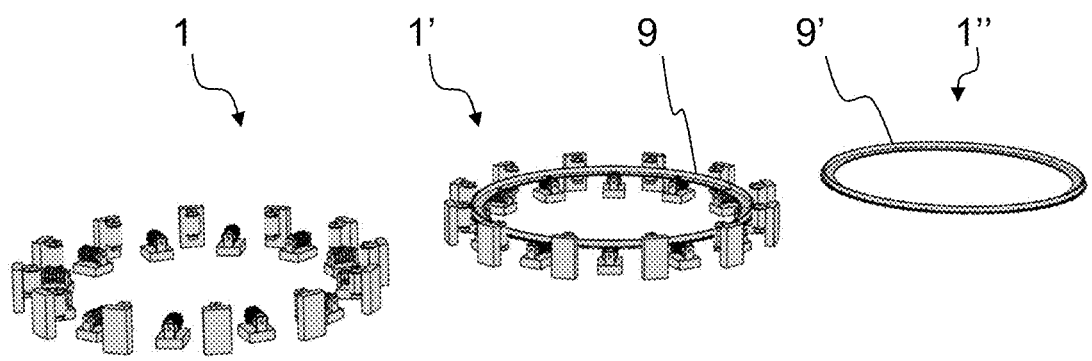
FIG. 2 shows three stations for the welding.

FIG. 2 shows three stations for the welding. A first welding station 1 and a second welding station 1' are provided in addition to a third station, which is a storage station 1", the latter comprising a stationary support ring 9'. A support ring 9 is provided on the second welding station 1', for example similar to the support ring 9' of the storage station 1". With further reference to FIG. 1, the support ring 9 is supported by the first rollers 5 and secured to be guided in a circle by the second rollers 6. Instead of the support ring 9, a support plate is optionally used on the second welding station 1'.

Figure 3A:
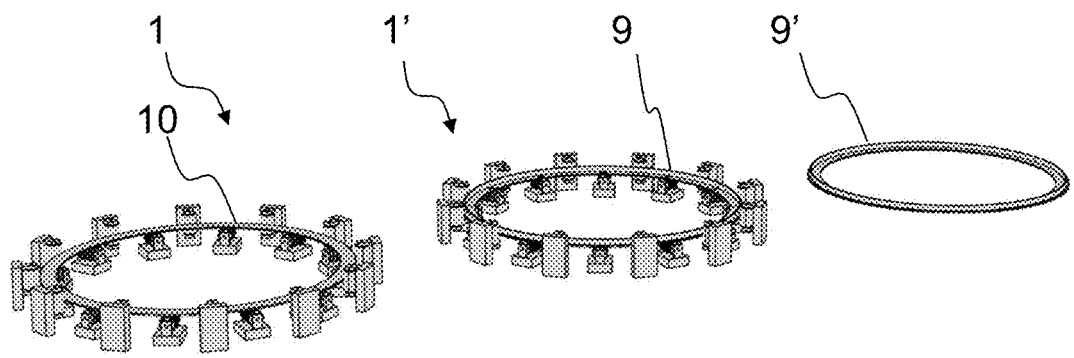
FIG. 3A shows a first assembly step in perspective view.
Figure 3B:
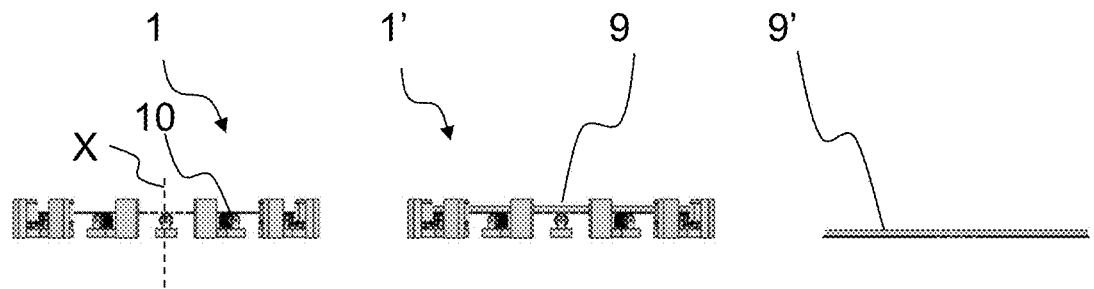
FIG. 3B shows a first assembly step in a side view.

FIG. 3A in perspective view and FIG. 3B in a side view showing a first assembly step using the first welding station 1 and second welding station 1'. A stiffening ring 10 is placed onto the support rollers 5 of the first welding station 1 for rotation about a vertical axis X, guided by the second rollers 6 abutting its outer periphery.

Figure 4:
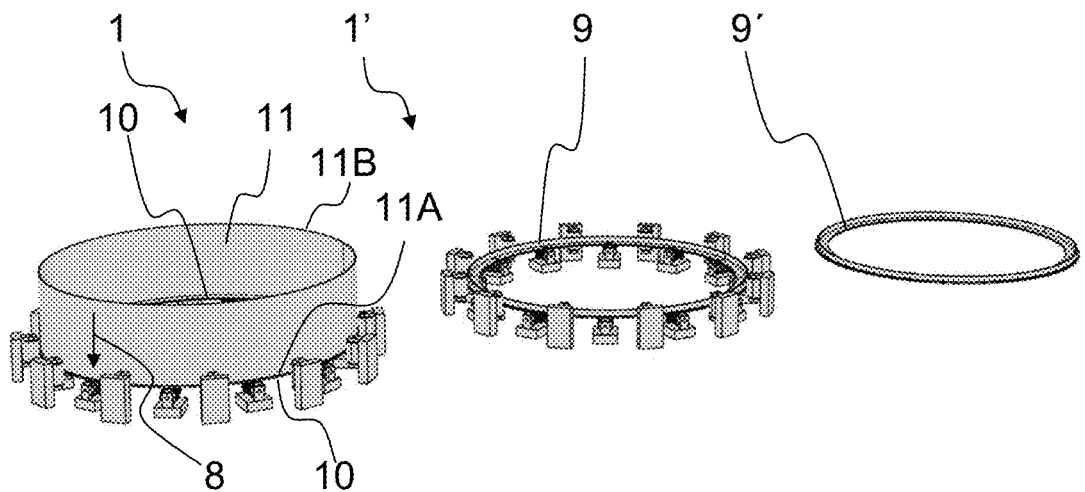
FIGS. 4-9 show subsequent steps for assembly of a double-segment.

FIG. 4 illustrates the placement of a first tubular member 11 onto the stiffening ring 10 with the first edge 11A of the first tubular member 11 abutting the upper surface of the stiffening ring 10. Advantageously, the first edge 11A has a smaller diameter than the stiffening ring 10 in order to ensure that the entire first edge 11A is resting on the stiffening ring 10 and is leaving sufficient space for a fillet weld, even if the first edge 11A is slightly deviating from a circular shape, for example due to deformation by transport and handling. The orientation of the first tubular member 11 being positioned on top of the stiffening ring 10 has an advantage in that the welding can be done from above, which is easier that welding from below, especially due to the melting of metal during the welding.

Figure 5A:
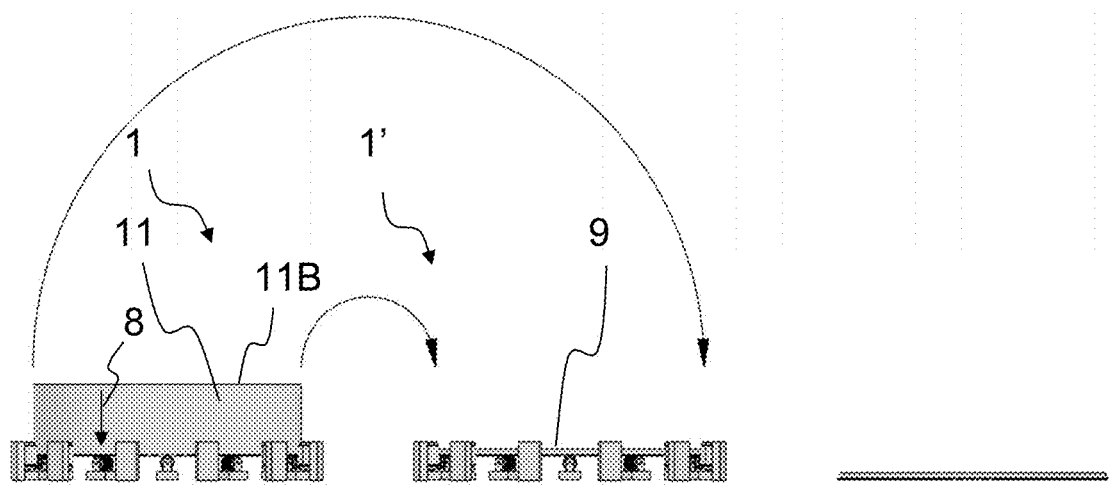
Figure 5B:
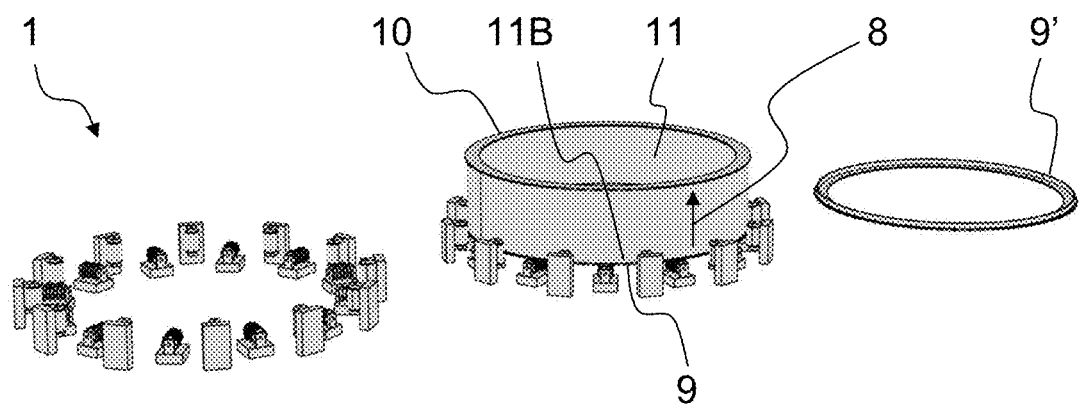

FIG. 5A illustrates the turning and movement of the first segment fabricated by welding of the tubular member 11 and the stiffening ring 10 from the first welding station 1 onto the second welding station 1'. The final result of the turned first segment onto the second welding station 1' is illustrated in FIG. 5B. The arrow 8 illustrates the orientation of the segment relative to the upside-down orientation in FIG. 5A, where the arrow 8 points downwards. While, the first edge 11A of the first tubular member 11 is welded to the first stiffening ring 10, the second edge 11B of the first tubular member 11 is resting on the support ring 9 but not getting fastened to the support ring 9, as the support ring 9 remains on the rollers 5 of the second support station 1' for supporting the various segments which are subsequently placed with their downward facing edge onto the support ring 9.

Figure 6:
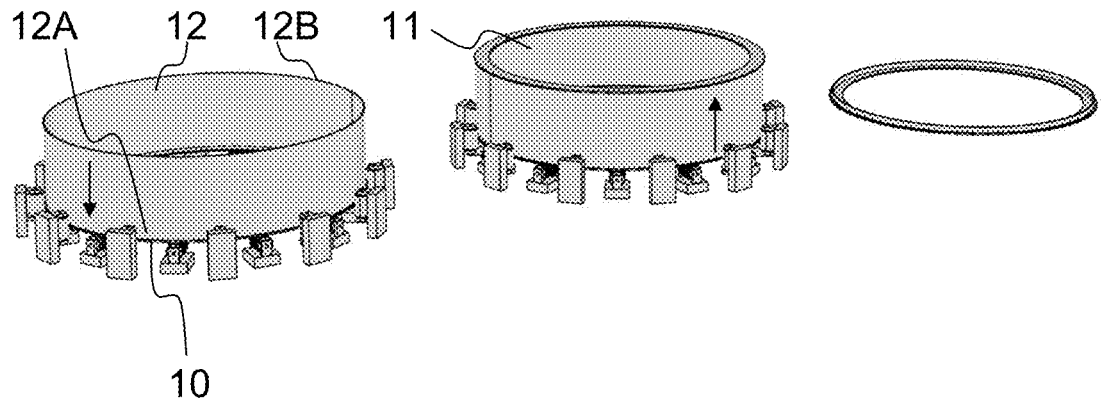

FIG. 6 illustrates the preparation of a second segment, where the first edge 12A of the second tubular member 12 is welded to a second stiffening ring 10 in the first welding station 1. The second stiffening ring 10, in the present exemplified case, is similar in dimensions to the first stiffening ring 10, although, this is not strictly necessary. The procedure is identical to the one for the first segment, illustrated in FIG. 4 and explained above.

Figure 7A:
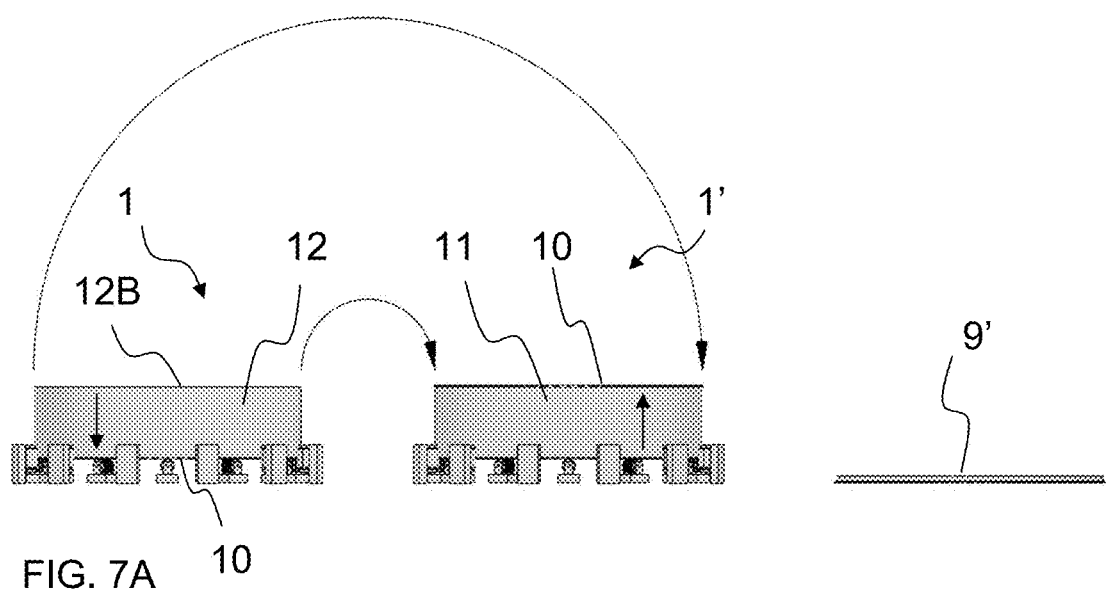
Figure 7B:
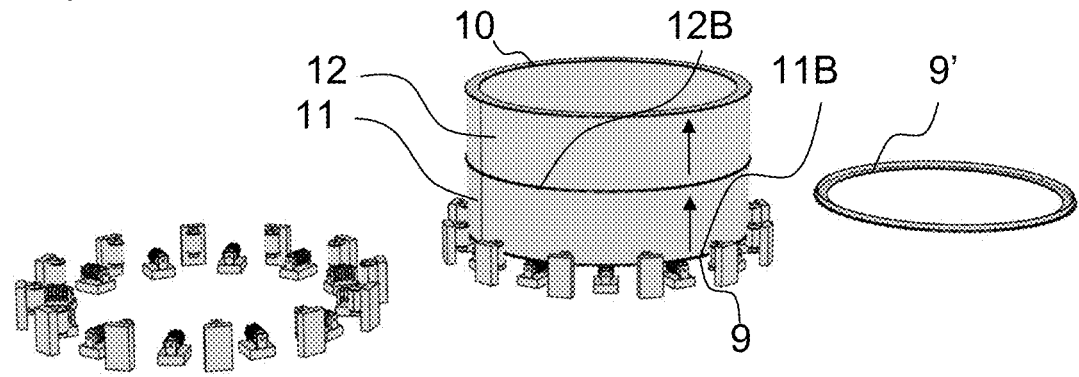

As illustrated in FIG. 7A, once finished with the welding in the first welding station 1, the second segment is turned and lifted onto the top of the first segment in the second welding station 1' such that the second and downward facing edge 12B of the second segment 12 is abutting the first stiffening ring 10 of the first segment 11 for welding, which is illustrated in FIG. 7B. By the welding in the second welding station 1', the two segments form a double segment 12/11 with two tubular segments 11, 12 fastened to each other with the first stiffening ring 10 as a single ring in between the two mutually adjacent tubular members 11, 12 and the second stiffening ring 10 at the top. The second edge 11B of the first segment 11 is resting on the support ring 9.

In the illustrated procedure, the first segment is lifted onto the second welding station 1', and the second segment is lifted on top of the first segment. Alternatively, the first segment is lifted off the first welding station 1 and onto the storage station 1", and the second segment after welding is lifted from the first welding station 1 onto the second welding station 1', after which the first segment is lifted from the storage station 1" onto the second segment in the second welding station 1'. This is possible but not preferred, as it requires an additional lifting operation. Noting the substantial size of the segments, with typically 5-10 meters diameter, the number of operations is advantageously minimized.

Figure 8:
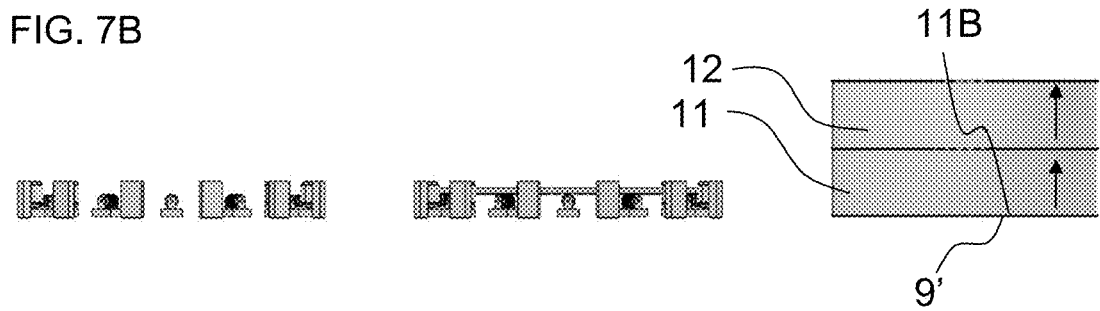

Subsequently, the double-segment 12/11 is lifted off the second welding station 1' and, as illustrated in FIG. 8, stored in the storage station 1" with the downward facing second edge 11B of the first tubular member 11 resting on the support ring 9' of the storage station 1".

Figure 9:
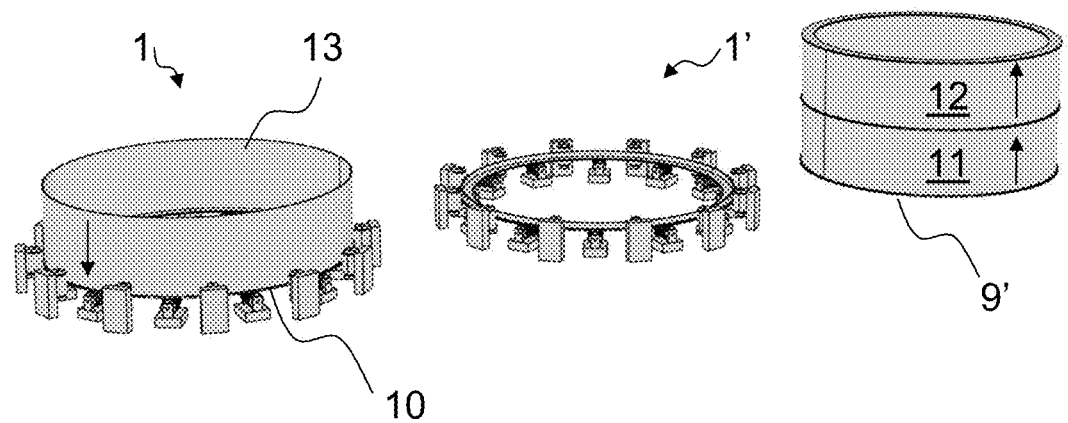
Figure 10A:
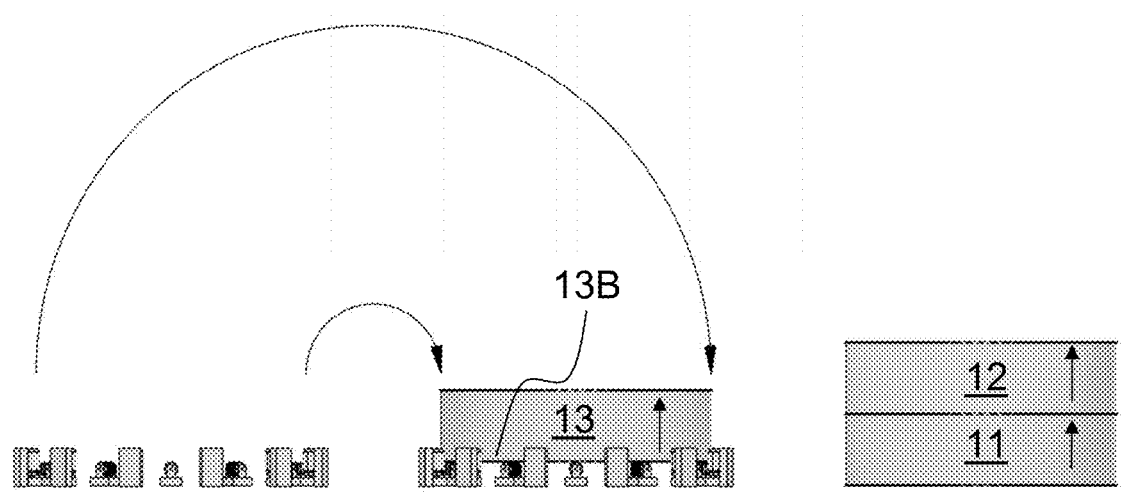
FIG. 10A shows a further assembly step in perspective view with a third segment inside view.
Figure 10B:
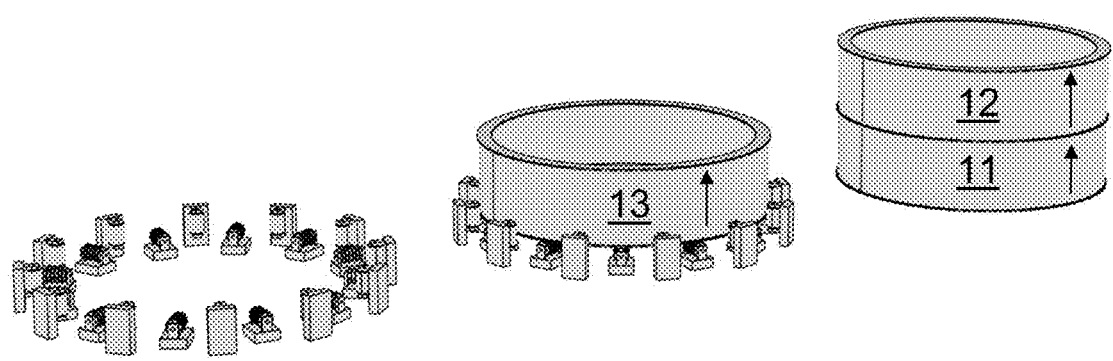
FIG. 10B shows a further assembly step in perspective view with a third segment in preparation.

FIG. 9 illustrates the welding of a third tubular member 13 to a third stiffening ring 10. As illustrated in FIG. 10A, the resulting third segment is lifted off the first welding station 1, turned, and lifted with the downward facing second edge 13B of the third tubular member 13 onto the upper surface of the support ring 9 of the second welding station 1' and with its stiffening ring 10 facing upwards, as illustrated in FIG. 10B.

Figure 11A:
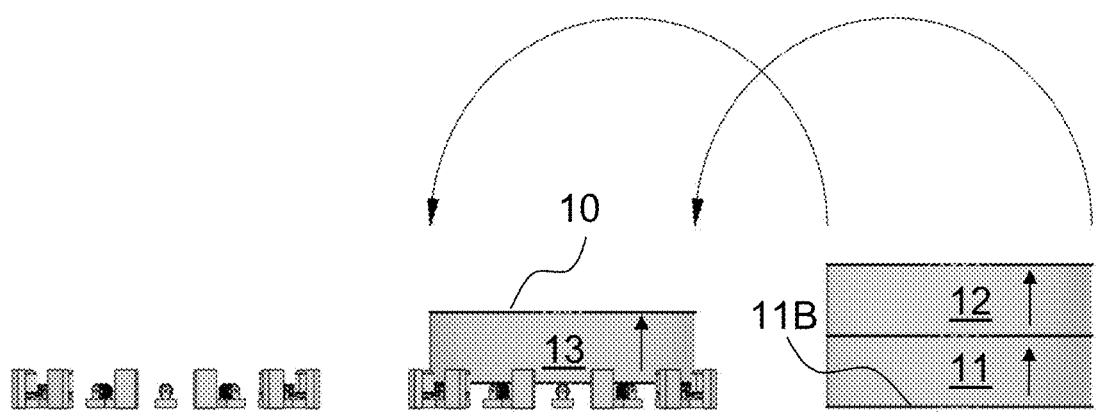
FIG. 11A shows assembly of a triple-segment in a side view.
Figure 11B:
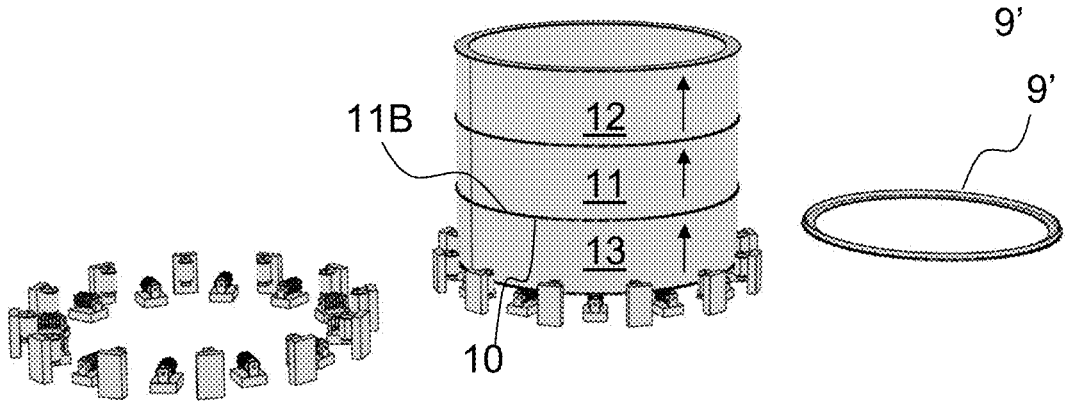
FIG. 11B shows assembly of a triple-segment in perspective view.

As illustrated in FIG. 11A, the double segment 12/11 is then lifted off the storage station 1" and with the downwards facing second edge 11B of the first tubular member 11 onto the third support stiffening ring 10 on top of the third tubular member 13, resulting in a configuration as illustrated in FIG. 11B. In the second welding station 1', the downwards facing second edge 11B of the first tubular member 11 is welded onto the third support stiffening ring 10 on top of the third tubular member 13 to form a triple-segment 12/11/13.

Figure 12:
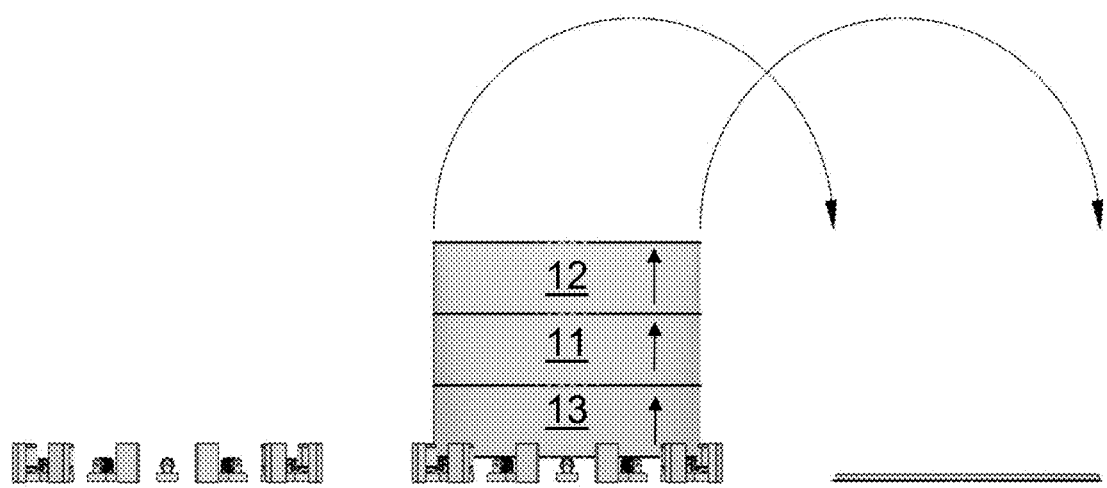
FIG. 12 illustrates a side view of a movement of a triple-segment to a storage station.
Figure 13:
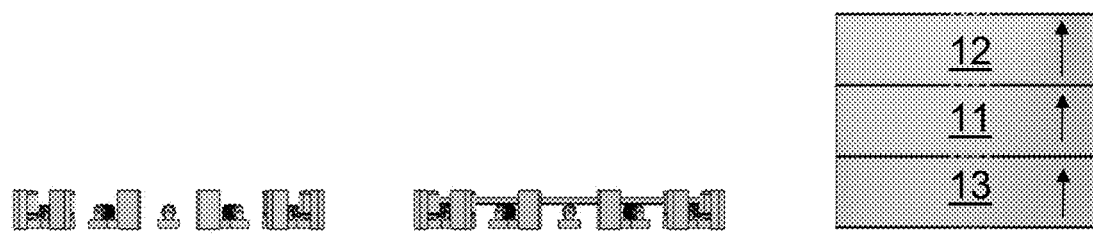
FIG. 13 illustrates a side view of a triple-segment in the storage station.
Figure 14:
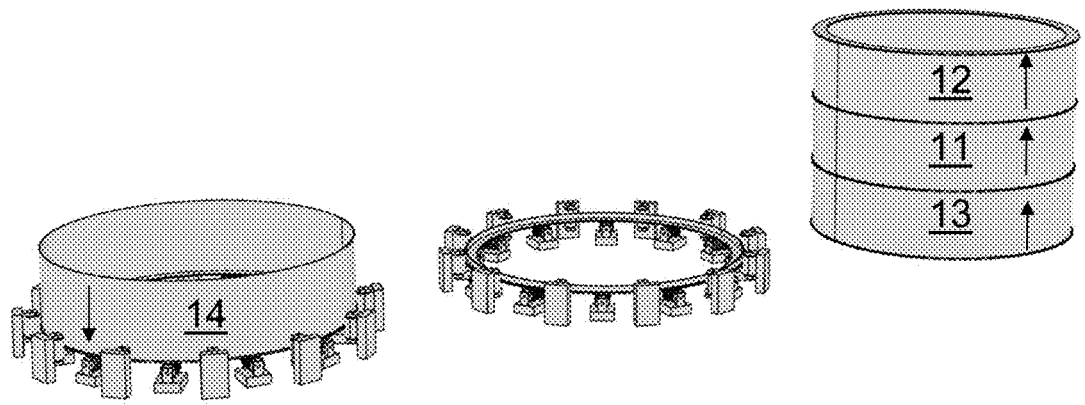
FIG. 14 illustrates a perspective view of a triple-segment in the storage station and preparation of a fourth segment in the first welding station.

As illustrated in FIG. 12, the triple-segment 12/11/13 is lifted off the second welding station 1' and, as shown in FIG. 13, stored in the storage station 1". As illustrated in FIG. 14, a fourth segment is produced in the first welding station 1 by using a further tubular member 14 and a further stiffening ring 10, and the explained procedure repeated for as many segments as desired to form the final buoyancy structure.

Although, requiring additional lifting steps, the illustrated procedure has some advantages as compared to an alternative, in which the double-segment 12/11 is not lifted off the second welding station 1' but the third segment 13 is lifted onto the top of the double segment 12/11, and the fourth segment 14 is lifted on top of the triple-segment. By lifting and moving the double segment 12/11, and correspondingly the triple segment 12/11/13 twice, namely from the second welding station 1' to the storage station 1" and back onto the second welding station 1' when a further single segment has been placed in the second welding station 1', it is always the lowest segment in the second welding station 1' that is welded. Accordingly, a welding head in the second welding station 1' need not be lifted upwards due to addition of segments. As the tubular members 11, 12, 13, 14 of the segments typically have the same height, there is no need to move the welding head for the assembly upwards with every added ring, which minimizes complexity in construction and operation as well as speed, in particular because the lifting and welding at the two stations 1, 1' can be done simultaneously.

Figure 15A:
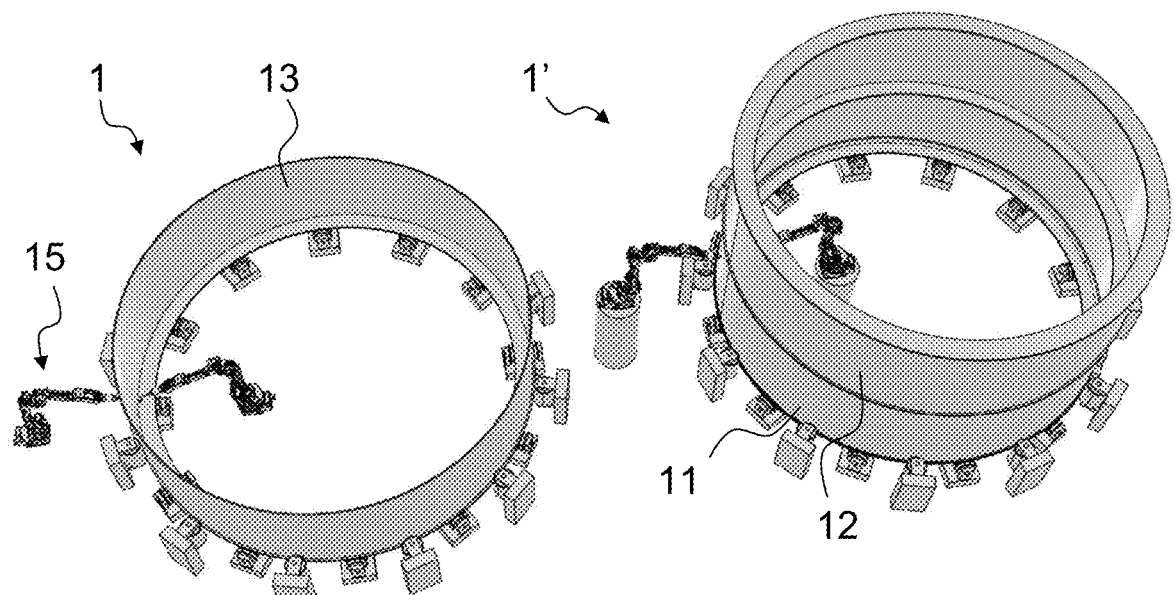
FIG. 15A shows welding machines in the first and second welding stations in perspective view.
Figure 15B:
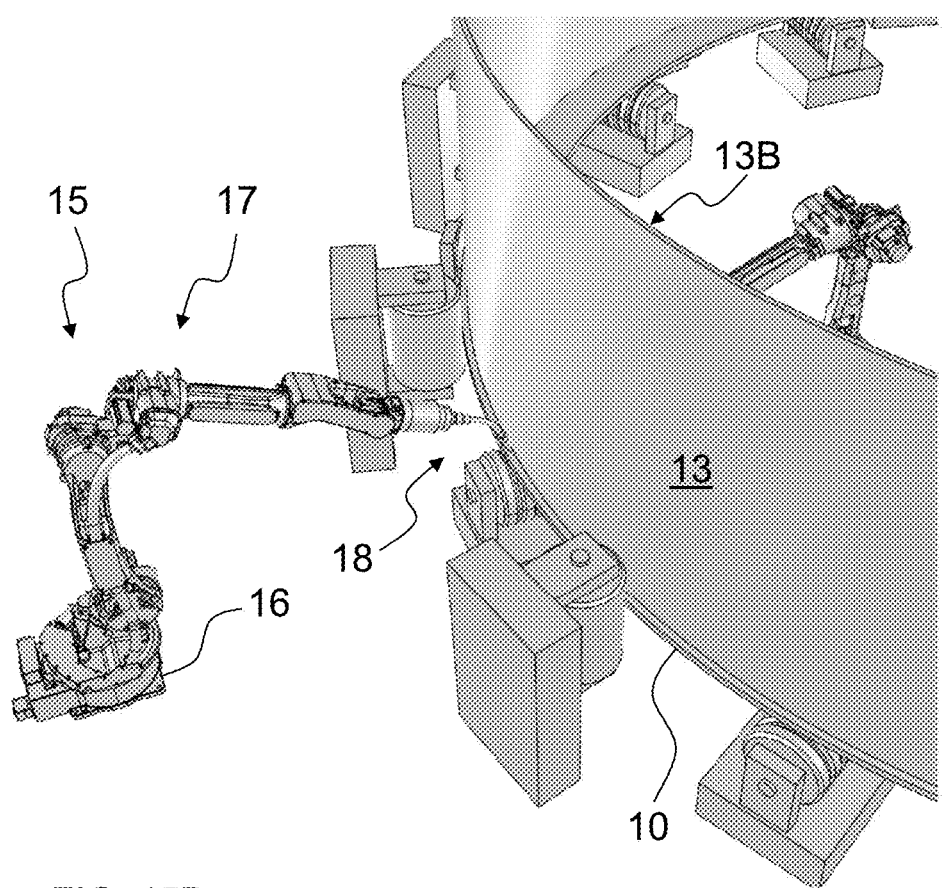
FIG. 15B shows an enlarged section of a welding machine in the first welding station.

A welding machine 15 is illustrated in FIG. 15A and in close up view in FIG. 15B. As illustrated in FIG. 15A, welding of the third tubular member 13 onto the corresponding stiffening ring 10 can be done simultaneously with the welding of the second tubular member 12 onto the stiffening ring 10 already welded to the first tubular member 11 of the first segment.

As illustrated in FIG. 15B, the welding machine 15 has a stationary base 16 and welds the third tubular member 13 onto the third stiffening ring 10 from above. The welding machine 15 has a linked arm 17 for moving the welding head 18 to the welding location. The distance of the welding head 18 from the stationary base 16 is adjustable for slight variations of the welding position and angle, but the welding machine 15 is not configured for reaching to the upper edge 13B of the third tubular member 13. This was explained above with the objective of simplicity of the welding station 15. However, as explained above in detail, it makes it necessary to move the longer multi-segments onto the storage station 1" and then from the storage station 1" onto the top of the stiffening ring 10 of a segment with only a single tubular member, once this additional single-segment has been fabricated in the first welding station 1 and moved to the second welding station 1'.

What is claimed is:

1. A method for assembling a buoyancy module of a tubular floating offshore structure, the method comprising:
   providing a first tubular member and a first stiffening ring for a first segment and a second tubular member and a second stiffening ring for a second segment, each of the first and second tubular members comprising a first edge and an opposite second edge;

for the first segment, providing the first stiffening ring lying flat and having an outer circumference larger than a circumference of the first edge of the first tubular member;
placing the first tubular member with its first edge onto the first stiffening ring within the outer circumference;
welding the first edge to the first stiffening ring from above;
for the second segment, providing the second stiffening ring lying flat and having an outer circumference larger than a circumference of the first edge of the second tubular member;
placing the second tubular member with its first edge onto the second stiffening ring within the outer circumference;
welding the first edge to the second stiffening ring from above;
turning both welded segments upside down so that their stiffening rings are facing upwards;
lifting one of the segments with the second edge of its tubular member onto the stiffening ring of the other of the segments; and
welding the second edge to the stiffening ring from above to form a double segment with one of the stiffening rings at a top of the double segment and with a downward facing second edge without a stiffening ring at a bottom of the double segment.

2. The method according to claim 1, further comprising:
providing a first welding station comprising a plurality of rollers arranged in a circular configuration and configured for rotationally supporting the first stiffening ring on the rollers in a horizontal orientation during the welding between the first tubular member and the first stiffening ring;
maintaining a first welding machine for the welding at a fixed location of the first welding station; and
welding the first tubular member to the first stiffening ring while rotating the first ring about its vertical central axis.

3. The method according to claim 2, wherein the rollers of the first welding station comprise first rollers that support a combination of tubular member and stiffening ring from below and second rollers that abut the combination sideways, and wherein the method further comprises guiding the combination by the second rollers during rotation and simultaneous welding.

4. The method according to claim 2, further comprising:
providing a second welding station comprising a plurality of other rollers arranged in a circular configuration and configured for rotationally supporting the first tubular member with its second edge facing downwards when the first stiffening ring is facing upwards;
after welding the first tubular member to the first stiffening ring in the first welding station so as to provide the first segment, lifting the first segment off the first welding station and turning the first segment upside down so that the first stiffening ring is facing upwards;
after welding the second tubular member to the second stiffening ring in the first welding station so as to provide the second segment, lifting the second segment off the first welding station and turning the second segment upside down so that the second stiffening ring is facing upwards;
after having been turned, lifting the first and second segment onto the second welding station, one above the other, and forming a double segment with an upper and a lower segment by welding the second edge of the upper of the two segments to the stiffening ring of the lower of the two segments in the second welding station with the rollers rotationally supporting the second edge of the lower of the two segments; and
maintaining a second welding machine at a fixed location of the second welding station and performing the welding from above a lower of the two stiffening rings while rotating the double segment about its vertical central axis.

5. The method according to claim 4, wherein the rollers of at least one of the first and second welding stations comprise first rollers that support a combination of tubular member and stiffening ring from below and second rollers that abut the combination sideways, and wherein the method further comprises guiding the combination by the second rollers during rotation and simultaneous welding.

6. The method according to claim 4, further comprising:
lifting the double segment off the second welding station and onto a storage station;
after welding the third tubular member to the third stiffening ring in the first welding station so as to provide the third segment, and after turning the third segment upside down with the third stiffening ring facing upwards, lifting the third segment onto the second welding station,
then, lifting the double segment off the storage station onto the third stiffening ring in the second welding station;
welding the second edge of the lower of the tubular members of the double segment onto the third stiffening ring and forming a triple segment of the first, second and third segments; and
lifting the formed triple segment off the second welding station.

7. The method according to claim 6, wherein the rollers of at least one of the first and second welding stations comprise first rollers that support a combination of tubular member and stiffening ring from below and second rollers that abut the combination sideways, and wherein the method further comprises guiding the combination by the second rollers during rotation and simultaneous welding.

8. The method according to claim 4, wherein the second welding station comprises a support ring or support plate in between the rollers and the second edge of the first tubular member, wherein the method further comprises lifting the first segment off the first welding station and turning it upside down and then placing the first segment onto the support ring or support plate of the second welding station prior to welding of the double segment in the second station.

9. The method according to claim 8, wherein the rollers of at least one of the first and second welding stations comprise first rollers that support a combination of tubular member and stiffening ring from below and second rollers that abut the combination sideways, and wherein the method further comprises guiding the combination by the second rollers during rotation and simultaneous welding.

10. The method according to claim 6, wherein the second welding station comprises a support ring or support plate in between the rollers and the second edge of the first tubular member, wherein the method further comprises lifting the first segment off the first welding station and turning it upside down and then placing the first segment onto the support ring or support plate of the second welding station prior to welding of the double segment in the second station.

11. The method according to claim 10, wherein the rollers of at least one of the first and second welding stations comprise first rollers that support a combination of tubular member and stiffening ring from below and second rollers that abut the combination sideways, and wherein the method further comprises guiding the combination by the second rollers during rotation and simultaneous welding.

12. The method according to claim 1, further comprising:
providing a third stiffening ring lying flat and having a third outer circumference larger than a circumference of a first edge of a third tubular member;
placing the third tubular member with its first edge onto the third stiffening ring within the third outer circumference;
welding the first edge of the third tubular member to the third stiffening ring so as to provide a third segment;
turning the third segment upside down so that the third stiffening ring is facing upwards;
lifting the double segment with the second edge without the stiffening ring onto the third stiffening ring and welding it to the third stiffening ring from above so as to provide a triple segment.

13. The method according to claim 12, further comprising:
providing a first welding station comprising a plurality of rollers arranged in a circular configuration and configured for rotationally supporting the first stiffening ring on the rollers in a horizontal orientation during the welding between the first tubular member and the first stiffening ring;
maintaining a first welding machine for the welding at a fixed location of the first welding station; and
welding the first tubular member to the first stiffening ring while rotating the first ring about its vertical central axis.

14. The method according to claim 13, wherein the rollers of the first welding station comprise first rollers that support a combination of tubular member and stiffening ring from below and second rollers that abut the combination sideways, and wherein the method further comprises guiding the combination by the second rollers during rotation and simultaneous welding.

15. The method according to claim 13, further comprising:
providing a second welding station comprising a plurality of other rollers arranged in a circular configuration and configured for rotationally supporting the first tubular member with its second edge facing downwards when the first stiffening ring is facing upwards;
after welding the first tubular member to the first stiffening ring in the first welding station so as to provide the first segment, lifting the first segment off the first welding station and turning the first segment upside down so that the first stiffening ring is facing upwards;
after welding the second tubular member to the second stiffening ring in the first welding station so as to provide the second segment, lifting the second segment off the first welding station and turning the second segment upside down so that the second stiffening ring is facing upwards;
after having been turned, lifting the first and second segment onto the second welding station, one above the other, and forming a double segment with an upper and a lower segment by welding the second edge of the upper of the two segments to the stiffening ring of the lower of the two segments in the second welding station with the rollers rotationally supporting the second edge of the lower of the two segments; and
maintaining a second welding machine at a fixed location of the second welding station and performing the welding from above a lower of the two stiffening rings while rotating the double segment about its vertical central axis.

16. The method according to claim 15, wherein the rollers of at least one of the first and second welding stations comprise first rollers that support a combination of tubular member and stiffening ring from below and second rollers that abut the combination sideways, and wherein the method further comprises guiding the combination by the second rollers during rotation and simultaneous welding.

17. The method according to claim 15, wherein the second welding station comprises a support ring or support plate in between the rollers and the second edge of the first tubular member, and the method further comprises lifting the first segment off the first welding station and turning it upside down and then placing the first segment onto the support ring or support plate of the second welding station prior to welding the double segment in the second station.

18. The method according to claim 17, wherein the rollers of at least one of the first and second welding stations comprise first rollers that support a combination of tubular member and stiffening ring from below and second rollers that abut the combination sideways, and wherein the method further comprises guiding the combination by the second rollers during rotation and simultaneous welding.

19. The method according to claim 15, wherein the second welding station comprises a support ring or support plate in between the rollers and the second edge of the first tubular member, wherein the method further comprises lifting the first segment off the first welding station and turning it upside down and then placing the first segment onto the support ring or support plate of the second welding station prior to welding of the double segment in the second station.

20. The method according to claim 17, wherein the second welding station comprises a support ring or support plate in between the rollers and the second edge of the first tubular member, wherein the method further comprises lifting the first segment off the first welding station and turning it upside down and then placing the first segment onto the support ring or support plate of the second welding station prior to welding of the double segment in the second station.

* * * * *